May 14, 1940.  W. A. YONKERS  2,200,318
VALVE, SELF-CLOSING AGAINST PRESSURE
Filed Feb. 23, 1937
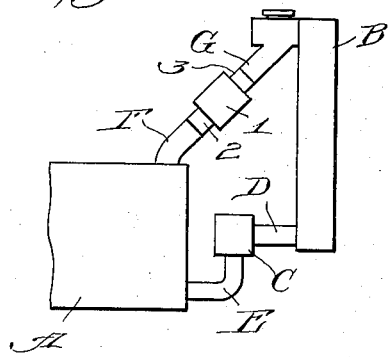
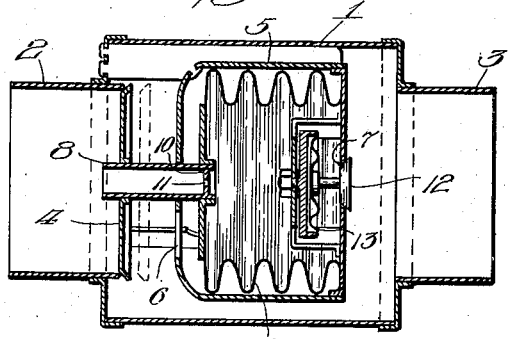
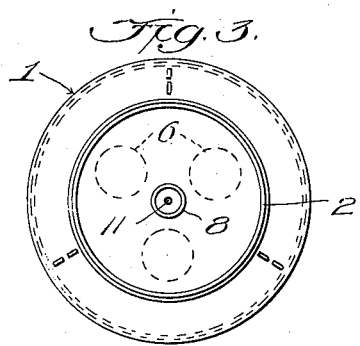
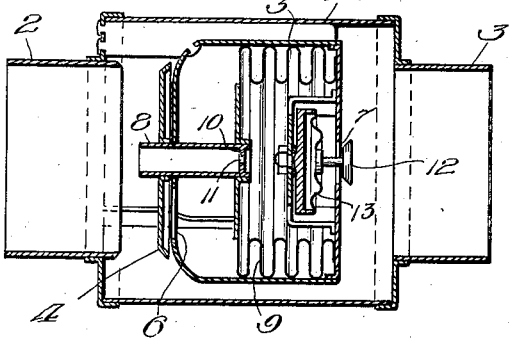
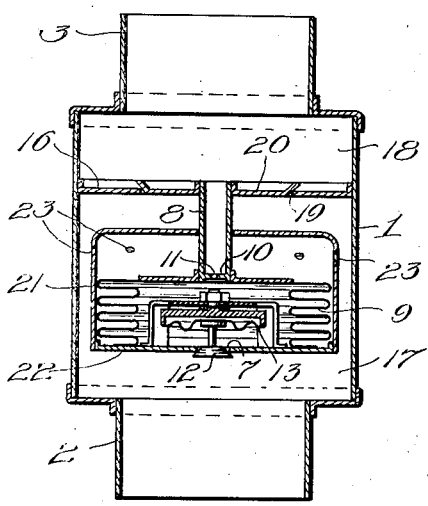
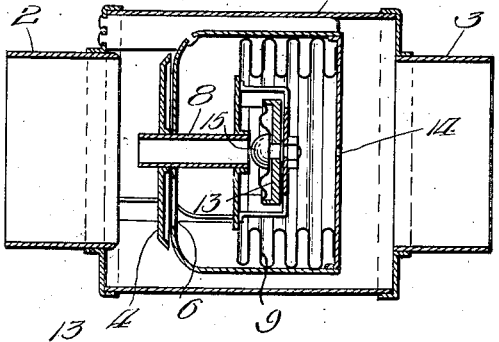
INVENTOR:
W. A. Yonkers,
BY Wm. F. Freudenreich,
ATTORNEY.

Patented May 14, 1940

2,200,318

UNITED STATES PATENT OFFICE 2,200,318

VALVE, SELF-CLOSING AGAINST PRESSURE

William A. Yonkers, Chicago, Ill., assignor to The Dole Valve Company, Chicago, Ill., a corporation of Illinois Application February 23, 1937, Serial No. 127,045

7 Claims. (Cl. 236—80)

The present invention relates to valves for permitting or stopping the flow of a fluid under pressure, and has for its object to produce a simple and novel mechanism whereby such a valve may be both opened and closed by the pressure of the fluid in the system controlled by a device that requires only a small amount of energy for its operation.

One instance of the use of a valve of this general type is the cooling system of a liquid cooled engine for automobiles, in which the circulation of the liquid is prevented until the liquid in the cylinder jackets has reached a predetermined temperature; the valve being automatically closed and held closed against pressure set up by the pump until such predetermined temperature is reached or exceeded. There are various objections to a valve operated and controlled in this way. One such objection is that if a little dirt becomes lodged between the valve and its seat, the valve cannot close tightly enough to prevent circulation of the cooling medium as soon as the pump starts. As a consequence, the purpose of the device namely, to prevent circulation of the cooling medium except when the cylinder walls are at a temperature for efficient working, may be entirely defeated, especially in cold weather. A further consequence of the presence of foreign matter between the valve and its seat is that the water may never become hot enough to cause the thermostat to open the valve and the foreign matter cannot be dislodged without giving special treatment to the cooling system. Furthermore, when the engine stops, so that circulation ceases and the thermostat cools, the valve closes and the heat stored in the cylinder walls may set up conditions, by generating steam, for example, producing back flow of the cooling liquid and an overflow thereof at the radiator.

Viewed in one of its aspects, the present invention may be said to have for one of its objects to produce a simple, efficient, reliable valve device for controlling the circulation in an engine cooling system or the like, which will obviate the objectionable features just noted, as well as others incident to the use of present types of thermostatically controlled valves.

In carrying out my invention I associate with a valve that controls the flow of water, steam, or other fluids, a pressure-responsive device including a movable member connected to the valve and constituting an actuator therefor. A small valve, controlled by a thermostat, electromagnetically, or in any other suitable way, permits the fluid in the system at times to exert on said member a differential pressure greater than and acting in opposition to the direct pressure of the fluid on the main valve and, at other times, a pressure that is overbalanced by the said pressure on the main valve. Thus the main valve may be either closed or opened by the direct fluid pressure thereon and be opened or closed and held open or closed by the pressure-responsive device.

In the event that this device is applied to the cooling system of engine cylinders, the setting or adjustment of the valve mechanism may be such that when the engine stops and there is no longer any pressure, the valve stands slightly open. Thus, any particles of grit or the like that may enter between the valve and its seat can drop out upon the stopping of the engine and the valve can close tightly when the engine is again started. Also, if the valve is partly open when there is no pressure, any circulation induced by hot portions of the engine cylinders, after the engine stops, will be in the normal direction and not a back flow through the circulating pump.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a longitudinal central section through a unit comprising a short section of a conduit for conveying fluids under pressure, and a valve mechanism embodying the present invention mounted thereon; Fig. 2 is a view similar to Fig. 1, illustrating the condition in which the main valve is open, whereas in Fig. 1 it is closed; Fig. 3 is an end view of the device appearing in Figs. 1 and 2; Fig. 4 is a view, partly in elevation and partly in section, of the thermostatic device; Fig. 5 is a view similar to Fig. 2, illustrating a modification; Fig. 6 is a view similar to Fig. 1, illustrating a further modification; Fig. 7 is a diagrammatic view illustrating the cooling system for a water-cooled automobile engine, containing one of my improved valve mechanisms.

In Figs. 1–4 there is illustrated a form of the invention in which the valve is opened by the pressure of the fluid against the same and is closed by a pressure-responsive device controlled by a thermostat. In this construction there is a small cylindrical casing 1 terminating at its ends in cylindrical tubular extensions 2 and 3 by which the casing may be coupled in a system through which fluid under pressure is adapted to flow.

Thus, for example, the casing may be connected in the cooling system for an automobile system as illustrated in Fig. 7, wherein A is the engine, B the radiator, C the circulating pump, D the conduit connecting the suction side of the pump to the bottom of the radiator, E the conduit connecting the discharge side of the pump to the lower end of the cooling chamber about the engine cylinders, and F and G the conduits which, along with the intervening casing 1, connect the upper ends of the cylinder cooling chamber and the radiator together.

The tubular part 2 is shown as projecting through the corresponding end wall of the casing 1 so that flow of fluid through the system may be permitted or stopped by a valve 4 seating against the inner end of the part 1, namely against the pressure tending to circulate the fluid through the passage comprising or including the interior of the casing. Means are provided by which the valve may be held closed by the pressure of the fluid itself against the pressure tending to blow it open. This means consists of a pressure-responsive device which may be subjected by said fluid to a differential pressure in opposition to and greater than the pressure on the valve or to pressure conditions that leave a balance of pressure in favor of the valve.

In the arrangement shown, there is fixed within the casing a receptacle 5 coaxial with but smaller in diameter than the casing. The receptacle is closed with the exception of holes 6 arranged in the front wall thereof within a central area smaller than that of the valve 4 and a port or opening 7 in the rear wall. The valve has a tubular, open-ended stem 8 fixed thereto and extending into the receptacle through the rear end wall of the latter. Within the receptacle is a hollow, expansible member which is shown as comprising a bellows device 9 anchored at one end to what may be termed the rear wall of the receptacle. The forward end of the expansible device is fixed to the end of the valve stem 8 in such a manner that fluid may pass through the valve and valve stem into the bellows device. The valve stem contains an internal transverse partition 10 having therein a port 11 which is much smaller than the hole 7 in the rear wall of the receptacle and which opens into the bellows device. The hole or port 7 is controlled by a small valve 12 adapted to be opened and closed in any suitable way. In the arrangement shown, the valve 12 is opened and closed by a suitable thermostatic device 13 mounted on the rear wall of the receptacle 5 within the bellows.

The thermostatic controller is set to hold the valve closed when the temperature of the fluid in contact with the controller is below a predetermined point and to open the valve when the temperature goes higher.

Assuming that the parts are in the positions illustrated in Fig. 2, both valves being open, and that fluid is flowing from left to right through the unit, this condition will be maintained until there is either a sufficient reduction of pressure on the inlet side or a sufficient drop in the temperature of the liquid. This follows from the fact that while the valve 12 is open, the pressure of the fluid on the lefthand face of the main valve 4 tends to hold the valve open. Some of the fluid flows through the valve stem 8 and into the bellows device; but, since the port 11 is smaller than the port 7, there cannot be set up in the bellows device a pressure that will expand the latter. However, should the temperature of the fluid drop sufficiently to cause the controlling valve 12 to close, the pressure within the bellows rises until it equals that of the fluid approaching the main valve. During normal operation, the pressure within the receptacle 5 on the outside of the bellows remains below the pressure of the fluid entering the unit. This is because the main valve lies in front of and close to the receptacle and acts to divide the current and divert it into the annular space around the receptacle which serves as a deflecting wall for the fluid. Consequently, a suction is produced in the space between the valve and the front wall of the receptacle, causing the pressure in this space and within the receptacle to be lowered. There is thus created a differential pressure on opposite sides of the front wall of the bellows which is opposite to that of the incoming fluid on the main valve. The diameter of the bellows device is sufficiently greater than that of the valve that the resultant pressure tending to expand the bellows is greater than the pressure of the incoming fluid on the main valve, as well as opposed thereto. Accordingly, when the pilot or controlling valve closes while fluid is entering the unit, the main valve is forced shut against the pressure of the oncoming fluid, as illustrated in Fig. 1.

After the main valve has closed, its subsequent opening may be made to depend on any one of several factors. As long as the pressure in the inlet to the unit continues, the main valve remains closed until the pilot valve opens. When this occurs, the pressure within the bellows device is relieved so that the resultant pressure thereon becomes less than that against the main valve which then opens.

The design of the bellows device may be such that the main valve stands in any desired position when not influenced by pressure. In other words, the valve may tend normally to assume a closed or an open or a partly open position. So far as insuring the mere interruption of flow of the fluid while the temperature is too low is concerned, it is immaterial what the normal position of the valve is. This is because as soon as pressure is applied in the system to cause the fluid to start flowing, the pressure within the bellows is built up until it overcomes that on the exterior plus that directly against the main valve and the latter is forced against its seat.

In such a system as that illustrated in Fig. 1, there may be some advantage in permitting the main valve to be partly open when there is no pressure in the system. In that case water can be forced between the valve and its seat in starting an engine, thereby washing away any foreign matter that may have adhered to the valve or its seat sufficiently not to drop off through the action of gravity. The greater the valve opening at the beginning, however, the more water will be circulated before the valve closes and, perhaps, the smaller will be the cleansing effect of the initial movement of the cooling water.

In Fig. 5 there is illustrated a construction which is just like that of Figs. 1 and 2, excepting with respect to the inlets and outlets to the expansion chamber in the bellows device. Instead of having a large hole 7 in the rear wall of the receptacle 5, I employ a small port 14 in the form of a restricted orifice. Furthermore, the partition is omitted from the interior of the valve stem 8, so that the opening into the front end of the bellows device, namely the lefthand end in Fig. 5, has the full cross sectional area of the bore through the stem. The thermostatic device 13 is mounted on the front wall of the expansible device, instead of on the rear wall, and is provided with a valve 15 adapted to cooperate with the adjacent end of the valve stem to control communication between the bore within the valve stem and the interior of the expansible device.

In Fig. 5 the main valve and the controlling valve are both shown in their open positions, the assuming of which depends upon the kind of conditions under which the valve device is intended to operate. For example, Fig. 5 may represent the relations of the parts when there is no pressure in the system and when the device is cool. In that case, the bellows device would need to be designed so as to permit the main valve to be open at this time and the thermostat to be so set that the controlling valve opens at one temperature and closes at a predetermined higher temperature. With such a design, upon the creation of a flow of fluid through the tubular inlet 2, some of the fluid travels straight ahead through the tubular stem and into the chamber in the bellows device. Since the outlet from this chamber is through the small port 14, the fluid enters faster than it can leave, and therefore a pressure is set up within the bellows device, and the resultant differential pressure on this device forces the main valve shut. This condition will continue until the thermostat becomes sufficiently heated and causes the controlling valve to close; whereupon the pressure on the bellows device becomes equalized, or, at least, the ratio between the pressure on the interior and on the exterior of the latter decreases to a point where the effective differential pressure is overbalanced by the direct pressure against the face of the valve 4 tending to open the latter, and thus the valve 4 is opened. This equalization of pressure or a reduction of the effective differential pressure on the bellows device results, of course, from the escape of fluid within the bellows device through the small port 14.

In Fig. 6 there is illustrated a device through which the fluid is adapted to flow in the opposite direction from that in which it moves through the devices of Figs. 1 and 5, the main valve being on the outlet side of the casing 1. In this particular construction, the casing has an interior partition wall 16 near the outlet end so as to divide the interior into a large chamber 17 and a small chamber 18. There is a large central opening 19 in the partition wall, and, cooperating with this opening, is a valve 20 lying within the small chamber when the valve is open and seated within said opening when the valve is closed. This valve is provided with a tubular stem having the partition 10 with its small port 11, as in Figs. 1 and 2; the stem being fixed to the movable end wall of the bellows device 9. The bellows device is housed within a receptacle 21, corresponding to the receptacle 5 in the previous forms, but differing somewhat therefrom. In the end wall 22 of the receptacle opposite that through which the valve stem 8 passes is the large port 7 controlled by the inwardly seating valve 12, which valve is operated by the thermostatic device 13. The wall 22 forms the stationary end wall of the expansible bellows device, as before. In the cylindrical wall of the receptacle 21 are suitable inlets 23, so fashioned and so disposed that when fluid under pressure is flowing through the casing in the upward direction as the device appears in Fig. 6, a part of the fluid is forced through these inlets 23 so as to build up pressure within the receptacle. This pressure tends to collapse the bellows device.

Assuming that the thermostatic device holds the valve 12 closed when the water or other fluid in the system is cold, then, the device being cold and the fluid on the inlet side being placed under pressure, this pressure acts directly on the valve 20 in a direction tending to open it. The pressure in the receptacle tends to collapse the bellows device since the interior of the latter is in communication with the low pressure side of the system, and, therefore, the differential pressure on the bellows device holds the main valve closed. When the temperature rises sufficiently to heat the thermostat and cause the controlling valve 12 to open, some of the incoming fluid flows directly into the interior of the bellows device through the large port 7 and, because it cannot escape through the port 11 as fast as it is entering, the effective pressure on the bellows device that is or may be in opposition to that on the main valve, is overbalanced by the pressure on the main valve and the latter is forced open. After the main valve has once opened, it may again be closed when the thermostat cools and the controlling valve 12 closes while there is a flow of fluid.

It will thus be seen that the pressure of a fluid in a space or passage through which fluid is adapted to flow may be controlled and utilized in a great variety of ways, through the employment of pressure responsive devices of any desired type, to control a main valve that permits or shuts off the flow of such fluid, without requiring any controller except a small valve. It will also be seen that the controlling valve may itself be controlled automatically by conditions existing within the system or, in any suitable manner, from a remote point or manually through a suitable handle or operating element for the controlling valve. Also, although, for the sake of brevity, I have not explained more than one or two of the uses to which the invention may be put, it will of course be understood that the invention may be employed wherever there is desired a type of control for fluid under pressure, exemplified by any of the forms of the invention which I have illustrated and explained in detail.

While I have illustrated and described with particularity only a single preferred form of my invention, with a few modifications, I do not desire to be limited to the exact structural details thus illustrated and described; but intend to cover all forms and arrangements which come within the definitions of my invention constituting the appended claims.

I claim:

1. The combination with a passage through which fluid is adapted to flow, of a receptacle, smaller in cross sectional area than said passage fixed within the latter so as to permit fluids to flow past the same, said passage containing a valve seat near one end of the receptacle, a valve for said seat, an actuator for said valve arranged within said receptacle and including a stem extending through said end and connected to the valve, said actuator including an expansion chamber, there being a port leading from said chamber through said valve and a port opening out of the chamber into the passage on the side of the valve opposite that with which the other port communicates when the valve is closed, and a valve device controlling one of said ports, said receptacle containing openings that permit fluid to enter the same.

2. The combination with a passage through which fluid is adapted to flow, of a receptacle, smaller in cross sectional area than said passage fixed within the latter so as to permit fluids to flow past the same, said passage containing a valve seat near one end of the receptacle, a valve for said seat, an actuator for said valve arranged within said receptacle and including a stem extending through said end and connected to the valve, said actuator including an expansion chamber, there being a port leading from said chamber through said valve and a port opening out of the chamber into the passage on the side of the valve opposite that with which the other port communicates when the valve is closed, and a valve device controlling one of said ports, said receptacle containing openings that permit fluid to enter the same, said openings being so located that they lie behind the valve when the latter is open, whereby the valve serves to deflect the fluid away from said openings and thus create a suction effect within the receptacle.

3. In combination, a cylindrical casing having in one end an inlet opening and in the other end an outlet opening, a receptacle, somewhat smaller in diameter than the casing, mounted within and coaxial with the casing, a valve for one of said openings, said valve having a tubular stem extending through one end of the receptacle, a pressure-responsive member within the receptacle connected to said stem, there being ports opening from the valve stem and from the end wall of the receptacle opposite that through which the valve stem extends communicating with the space in the receptacle behind the pressure-responsive device, one of said ports being much larger than the other, and a controlling valve for one of said ports.

4. In combination, a cylindrical casing having in one end an inlet opening and in the other end an outlet opening, said openings having diameters greater than a radius of the casing, a receptacle somewhat smaller in diameter than the casing mounted within and coaxial with the casing, a valve for one of said openings, said valve having a tubular stem extending through one end of the receptacle, the latter end of the receptacle having openings therein behind the aforesaid valve, a pressure responsive member within the receptacle connected to said stem, there being ports opening from the valve stem and from the end wall of the receptacle opposite that through which the valve stem extends communicating with the space in the receptacle behind the pressure-responsive device, one of said ports being much larger than the other, and a controlling valve for one of said ports.

5. In combination, a cylindrical casing having in one end an inlet opening and in the other end an outlet opening, said openings having diameters greater than a radius of the casing, a receptacle, somewhat smaller in diameter than the casing, mounted within and coaxial with the casing, a valve for one of said openings, said valve having a tubular stem extending through one end of the receptacle, a pressure responsive member within the receptacle connected to said stem, said receptacle having openings therein to permit fluids to enter the same in front of said pressure-responsive device, there being ports opening from the valve stem and from the end wall of the receptacle opposite that through which the valve stem extends communicating with the space in the receptacle behind the pressure-responsive device, one of said ports being much larger than the other, and a controlling valve for one of said ports.

6. In combination, a sheet metal cylindrical casing having in each end a central opening of large diameter, a cylindrical sheet metal receptacle, closed at the ends, and of smaller diameter than the casing, fixed within and coaxial with the latter, a valve for one of said openings, a tubular, open-ended stem for said valve extending through the adjacent end wall of said receptacle, a pressure-responsive device fixed to the end of said stem within the receptacle, the end wall of the receptacle opposite that through which the said valve stem passes having therein a constantly open port much smaller than the internal diameter of the valve stem, and a thermostatically controlled valve for opening and closing the passage through the valve stem.

7. In combination, a sheet metal cylindrical casing having in each end a central opening of large diameter, a cylindrical sheet metal receptacle, closed at the ends, and of smaller diameter than the casing, fixed within and coaxial with the latter, a valve for one of said openings, a tubular, open-ended stem for said valve extending through the adjacent end wall of said receptacle, a pressure-responsive device fixed to the end of said stem within the receptacle, the end wall of the receptacle opposite that through which the said valve stem passes having therein a constantly open port much smaller than the internal diameter of the valve stem, the cylindrical wall of the receptacle having small passages extending through the same at a small angle to the axis of the receptacle and having their inner ends directed toward the end of the receptacle at which the aforesaid valve is located, and a thermostatically controlled valve for opening and closing the passage through the valve stem.

WILLIAM A. YONKERS.